Feb. 14, 1933.                E. S. CORNELL, JR                1,897,572
                        COMBINED CHECK VALVE AND STRAINER
                           Filed Oct. 10, 1930        2 Sheets-Sheet 1
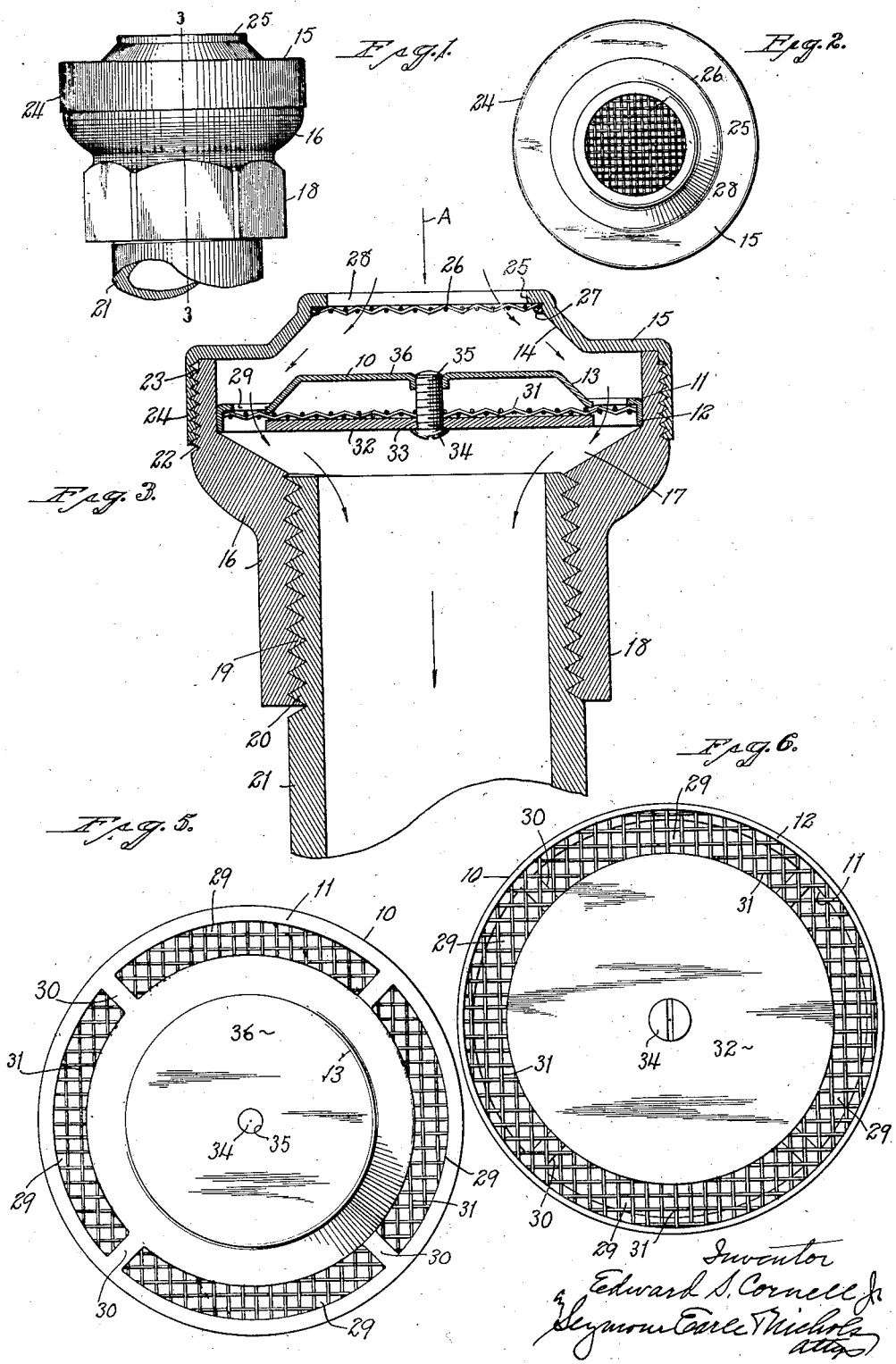

Feb. 14, 1933.   E. S. CORNELL, JR   1,897,572
COMBINED CHECK VALVE AND STRAINER
Filed Oct. 10, 1930   2 Sheets-Sheet 2
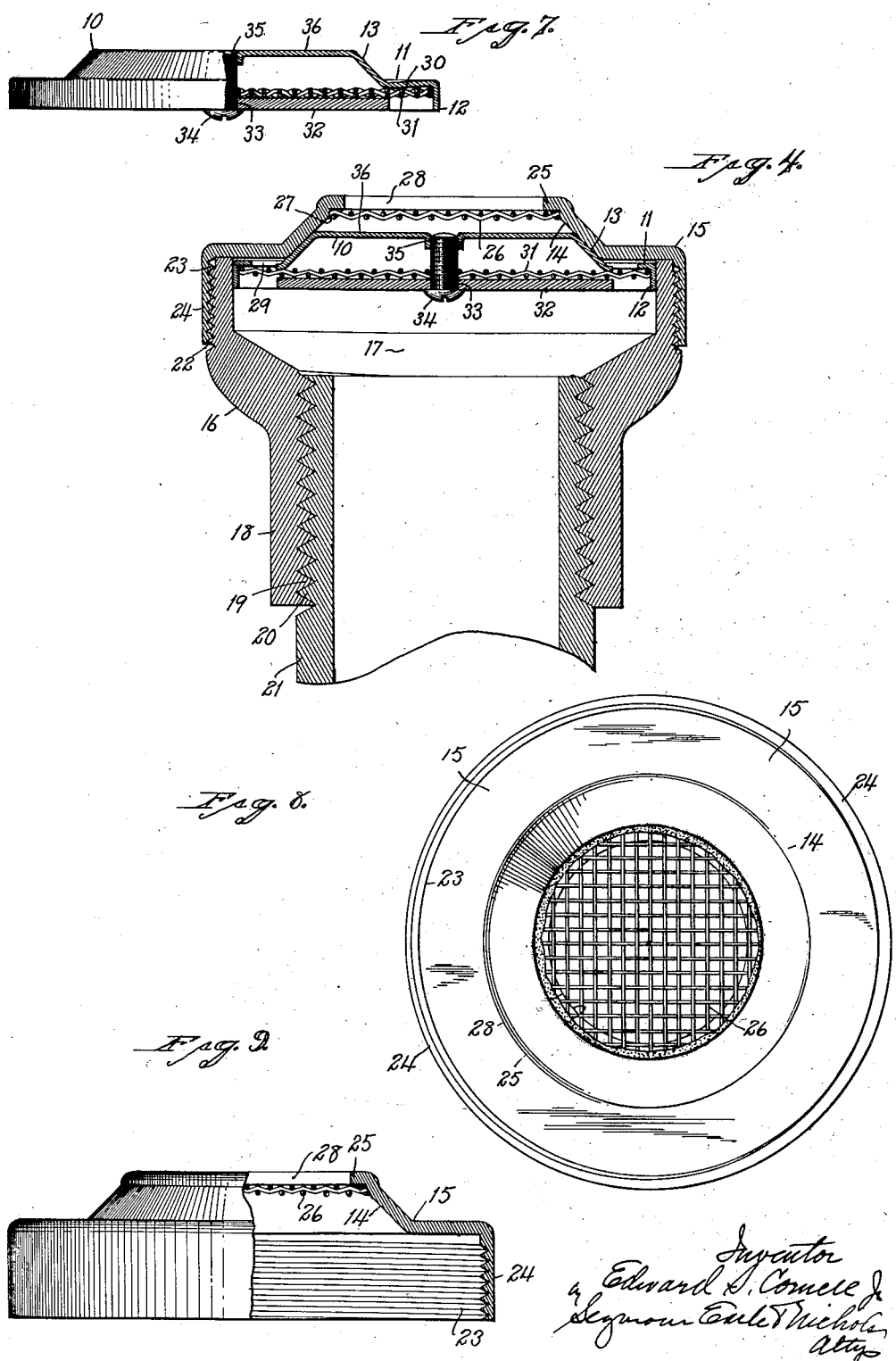

Patented Feb. 14, 1933

1,897,572

UNITED STATES PATENT OFFICE

EDWARD S. CORNELL, JR., OF WATERTOWN, CONNECTICUT, ASSIGNOR TO THE CHASE COMPANIES, INC., OF WATERBURY, CONNECTICUT, A CORPORATION

COMBINED CHECK-VALVE AND STRAINER

Application filed October 10, 1930. Serial No. 487,749.

This invention relates to an improved combined check-valve and strainer and has for its main object the provision at a low cost for manufacture of a simple, reliable and effective device of the class referred to, constructed with particular reference to sureness of operation and ease of cleaning.

With the above and other objects in view as will appear from the following, my invention consists in a combined check-valve and strainer having certain details of construction and combinations of parts as will be hereinafter described and particularly recited in the claims.

In the accompanying drawings:

Fig. 1 is a view in side elevation of a combined check-valve and strainer embodying my invention and shown as applied to the end of a suction-pipe;

Fig. 2 is a view looking toward the outer end thereof;

Fig. 3 is a view in central longitudinal section taken on the line 3—3 of Fig. 1 but on a larger scale and showing the closure-and-strainer unit in its open position;

Fig. 4 is a view corresponding to Fig. 3 but showing the closure-and-strainer unit in its closed position;

Fig. 5 is a view of the closure-and-strainer unit detached, looking toward the outer face thereof;

Fig. 6 is a similar view but looking toward the inner face of the closure-and-strainer unit;

Fig. 7 is a detached view of the closure-and-strainer unit partly in edge elevation and partly in section;

Fig. 8 is a view of the cap detached, looking toward the inner face thereof; and Fig. 9 is a view thereof partly in edge elevation and partly in section.

The particular check-valve and strainer herein chosen for the illustration of my invention is of a type designed as a terminal fitting for the suction- or other outlet-pipes of oil-storage tanks, etc., but it is to be understood that my invention is not so limited.

In carrying out my invention as herein shown, I employ a disk-shaped closure-and-strainer unit 10 consisting of a cup-shaped sheet-metal disk 11 having an annular flange 12 and centrally embossed to form a conical seat-engaging projection 13 adapted to coact with a conical seat 14 in a cap-member 15 of a suitable housing which, as herein shown, consists in addition to the said cap of a body-member 16 enlarged at its upper end to form a chamber 17 and having a hollow shank 18 formed internally with screw-threads 19 for coaction with the external threads 20 of a suction-pipe 21 or other suitable duct.

The enlarged upper end of the body-member 16 is provided with external threads 22 upon which are screwed threads 23 formed internally upon the skirt 24 of the cap 15.

The cap 15 above referred to is preferably formed of sheet-metal and has its central portion struck up to form the conical seat 14 already referred to, as well as to provide a retaining-flange 25, against the under-face of which is seated a disk of metallic gauze 26 which is secured in place as shown by means of solder 27. The retaining-flange 25 encompasses an inlet-opening 28 provided for the inlet of oil or other fluids into the housing in the direction of the arrow A. (Fig. 3).

The sheet-metal disk 11 of the closure-and-strainer unit 10 already referred to has a sliding fit with respect to the annular side-wall of the chamber 17 and is formed at the base of its conical projection 13 with four segmental passages 29 which are separated by relatively-narrow webs 30, which latter serve to connect the conical projection 13 with the flange 12.

Seated within the flange 12 of the closure-and-strainer unit, so as to cover the segmental passages 29 therein, is a disk-shaped piece of metallic gauze 31 clamped in place by a relatively-large washer 32 formed with an axial passage 33 through which passes a coupling-screw 34 having its threaded outer end screwed into an axial threaded bore 35 formed in the flat outer face 36 of the conical projection 13.

For the purpose of describing the operation of the particular form of my improved combined check-valve and strainer herein shown, let it be supposed that the suction-pipe 21 is connected to a suitable pump. If this pump be of the reciprocating type, upon each suction stroke thereof the closure-and-strainer unit 10 will be drawn into the position shown in Fig. 3, thereby permitting the inward flow of fluid through the gauze 26 and through such portions of the edge of the gauze 31 as underlie the segmental passages 29, as clearly indicated by arrows in Fig. 3. Upon a reverse stroke of the pump, the closure-and-strainer unit 10 will be forced into the position shown in Fig. 4, in which the conical seat-engaging projection 13 thereof is seated against the conical seat 14 in the cap-member 15, thus preventing the reverse flow of fluid.

By providing a combined closure-and-strainer unit which moves back and forth in response to the tendency of the fluid to flow in one direction or the other, the strainer-portion functions for a longer period without cleaning than is the case in valves where the strainer has no movement.

While I have herein shown my improved combined check-valve and strainer as designed as a terminal fitting for a suction-pipe, it is obvious that if desired a tube may be soldered or otherwise secured to the outer face of the cap 15 in line with the passage 28 therein, so that, in a sense, instead of being a terminal fitting, my improved device is interposed in a flow-passage.

It will be understood by those skilled in the art that my invention may assume varied physical forms without departing from my inventive concept, and I, therefore, do not limit myself to the specific embodiment herein chosen for illustration, but only as indicated in the appended claims.

I claim:

1. In a combined check-valve and strainer, the combination with a housing; of a valve-seat in the said housing; a combined closure-and-strainer unit bodily slidable relatively to and within the said housing and formed centrally with a seat-engaging portion co-operating with the said valve-seat to prevent the flow of fluid in one direction and provided with a strainer outside of the said central seat-engaging portion acting to filter fluid flowing in an opposite direction.

2. In a combined check-valve and strainer, the combination with a housing; of a valve-seat in the said housing; a combined closure-and-strainer unit bodily slidable relatively to and within the said housing and formed centrally with a seat-engaging portion co-operating with the said valve-seat to prevent the flow of fluid in one direction and provided with a substantially annular strainer-area surrounding the said central seat-engaging portion and acting to filter fluid flowing in an opposite direction.

3. In a combined check-valve and strainer, the combination with a housing; of a valve-seat in the said housing; a combined closure-and-strainer unit bodily slidable relatively to and within the said housing and consisting of a member formed centrally with a seat-engaging portion co-operating with the said valve-seat to prevent the flow of fluid in one direction and having its area outside the said seat-engaging portion skeletonized to provide flow-passages, and a gauze-member secured to the first-mentioned member in position to overlie the passages in the skeletonized portion thereof to filter fluid flowing in an opposite direction.

4. In a combined check-valve and strainer, the combination with a housing consisting of a body-member and an apertured cap therefor; of a valve-seat formed in the inner face of the said cap; and a combined closure-and-strainer unit bodily slidable relatively to and within the said housing and formed centrally with a seat-engaging portion co-operating with the said seat to prevent the flow of fluid in one direction and provided with a strainer-area outside of the said seat-engaging portion acting to filter fluid flowing in an opposite direction.

5. In a combined check-valve and strainer, the combination with a housing consisting of a body-member and an apertured cap therefor; of a valve-seat formed in the inner face of the said cap; and a combined closure-and-strainer unit bodily slidable relatively to and within the said housing and formed centrally with a seat-engaging portion co-operating with the said valve-seat to prevent the flow of fluid in one direction and provided with a substantially annular strainer-area surrounding the said central seat-engaging portion and acting to filter fluid flowing in an opposite direction.

6. In a combined check-valve and strainer, the combination with a housing; of a valve-seat in the said housing; a combined closure-and-strainer unit bodily slidable relatively to and within the said housing and consisting of a sheet-metal member centrally embossed to form a seat-engaging portion and perforated in the area around the said centrally-embossed seat-engaging portion to provide fluid-passages, and a strainer-member united with the said sheet-metal member to overlie the perforated portion thereof and bodily movable therewith.

In testimony whereof, I have signed this specification.

EDWARD S. CORNELL, Jr.